US010840568B2

(12) United States Patent
Yoon

(10) Patent No.: US 10,840,568 B2
(45) Date of Patent: Nov. 17, 2020

(54) APPARATUS AND METHOD FOR DETECTING WATER

(71) Applicants: Hyundai Motor Company, Seoul (KR); Kia Motors Corporation, Seoul (KR)

(72) Inventor: Jong Hu Yoon, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 320 days.

(21) Appl. No.: 16/028,509

(22) Filed: Jul. 6, 2018

(65) Prior Publication Data

US 2019/0312321 A1 Oct. 10, 2019

(30) Foreign Application Priority Data

Apr. 10, 2018 (KR) ........................ 10-2018-0041760

(51) Int. Cl.
*G01M 3/04* (2006.01)
*G01M 3/24* (2006.01)
*G08B 21/20* (2006.01)
*H01M 10/6568* (2014.01)
*H01M 10/63* (2014.01)
*G01M 3/18* (2006.01)
*H01M 10/6567* (2014.01)
(Continued)

(52) U.S. Cl.
CPC ............. *H01M 10/63* (2015.04); *G01M 3/04* (2013.01); *G01M 3/18* (2013.01); *G01M 3/24* (2013.01); *G08B 21/20* (2013.01); *H01M 10/425* (2013.01); *H01M 10/488* (2013.01); *H01M 10/613* (2015.04); *H01M 10/6552* (2015.04); *H01M 10/6567* (2015.04); *H01M 2220/20* (2013.01)

(58) Field of Classification Search
CPC ............ G01M 3/00; G01M 3/02; G01M 3/04; G01M 3/16; G01M 3/165; G01M 3/18; G01M 3/181; G01M 3/182; G01M 3/183; G01M 3/184; G01M 3/185; G01M 3/186; G01M 3/187; G01M 3/188; G01M 3/24; G01M 3/243; G01M 3/246; G01M 3/08; G01M 3/40; G08B 21/20
See application file for complete search history.

(56) References Cited

U.S. PATENT DOCUMENTS 10,121,353 B1* 11/2018 Billman ................. G08B 25/10
2012/0132286 A1* 5/2012 Lim ..................... H01M 2/1072
137/1

(Continued)

FOREIGN PATENT DOCUMENTS

KR  10-1995-0053919        10/1998
KR  10-2017-0121573 A      11/2017
KR  10-1834252 B1          3/2018

*Primary Examiner* — Herbert K Roberts
(74) *Attorney, Agent, or Firm* — Mintz Levin Cohn Ferris Glovsky and Popeo, P.C.; Peter F. Corless

(57) ABSTRACT

An apparatus for detecting water includes at least one battery module for producing and supplying electricity to outside of the apparatus, a housing for accommodating the battery module, and a touch panel for detecting a contact position of water when the water makes contact with one surface of the touch panel, and the touch panel includes a first touch panel located in a first area where the battery module is formed.

30 Claims, 9 Drawing Sheets

(51) Int. Cl.
*H01M 10/6552* (2014.01)
*H01M 10/42* (2006.01)
*H01M 10/48* (2006.01)
*H01M 10/613* (2014.01)

(56) References Cited

U.S. PATENT DOCUMENTS

| | | | |
|---|---|---|---|
| 2014/0041449 A1* | 2/2014 | Lim | G01F 23/30 |
| | | | 73/309 |
| 2017/0063117 A1* | 3/2017 | Ban | H02J 7/007 |
| 2018/0238764 A1* | 8/2018 | Kim | H01M 10/613 |
| 2019/0079037 A1* | 3/2019 | Jol | G01N 27/048 |

* cited by examiner

APPARATUS AND METHOD FOR DETECTING WATER

CROSS-REFERENCE TO RELATED APPLICATION

This application claims under 35 U.S.C. § 119(a) the benefit of Korean Patent Application No. 10-2018-0041760, filed on Apr. 10, 2018 in the Korean Intellectual Property Office, the entire contents of which are incorporated by reference herein.

BACKGROUND

(a) Technical Field

The present disclosure relates to an apparatus and method for detecting water, more particularly, to a water detection apparatus and method for preventing explosion and ignition of a secondary battery so as to ensure safety and reliability.

(b) Description of the Related Art

In general, examples of a secondary battery include a nickel cadmium battery, a nickel metal hydride battery, a lithium ion battery, a lithium ion polymer battery, and the like. These secondary batteries are employed for large-sized products requiring high power, such as electric vehicles or hybrid electric vehicles, and power storage devices and backup power storage devices for storing excess generated-output or new renewable energy, as well as small-sized products such as a digital camera, a P-DVD, an MP3P, a mobile phone, a PDA, a portable game device, a power tool, an E-bike, and the like.

In recent years, in the case of a secondary battery applied to a large-sized product, for example, an electric vehicle, development for increasing the output and lifetime of the secondary battery by improving the performance thereof has been conducted to increase the mileage and speed of the electric vehicle. However, since the number and capacity of battery cells accommodated in the secondary battery increase with the improvement in the performance of the secondary battery, explosive power also increases when the secondary battery is exposed to danger to explode. Therefore, it is important to ensure safety and reliability with the improvement in the performance of the secondary battery.

In particular, a cooling system for cooling the secondary battery is applied to the electric vehicle. The cooling system may be broadly categorized as either a water cooling system or an air cooling system. In the case of the water cooling system, cooling water generally does not leak since the cooling water circulates in a system with an enclosed structure. However, the cooling water may leak due to cracks or damage caused by deterioration of the cooling system, some defective parts, frequent collisions during driving, a car accident, and the like. The leaked cooling water may flow into the second battery to cause internal short and explosion of the secondary battery.

Even in the case of the air cooling system, foreign matter, including water, may infiltrate through an inlet duct. In general, a battery module is spaced apart from the bottom, or a drain hole is formed to discharge introduced water to the outside, in case of water infiltration. However, in the case where a large amount of foreign matter is accumulated in the drain hole or the drain hole is clogged with frozen water in the winter season, the introduced water may not be discharged and may flow into the battery module. Further, if the amount of water significantly increases, the battery module may be submerged and a serious accident may occur correspondingly.

SUMMARY

An aspect of the present disclosure provides a water detection apparatus and method for preventing explosion and ignition of a secondary battery and ensuring safety and reliability.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for detecting water includes at least one battery module for producing and supplying electricity to outside of the apparatus, a housing for accommodating the battery module, and a touch panel for detecting a contact position of water when the water makes contact with one surface of the touch panel, and the touch panel includes a first touch panel located in a first area where the battery module is formed.

According to an embodiment, the first touch panel may be located below the battery module.

According to an embodiment, the first touch panel may be formed in plural and may also be located above the battery module.

According to an embodiment, the touch panel may further include a second touch panel formed in plural and also located in a second area where the battery module is not formed.

According to an embodiment, the apparatus may further include a cooling block located in the first area to cool the battery module by making cooling water flow in the cooling block and a cooling water hose through which the cooling water flows into or out of the cooling block, and the cooling water hose may be formed in the second area.

According to an embodiment, the cooling block may be located below the battery module.

According to an embodiment, the cooling block may be formed in plural and may also be located above the battery module.

According to an embodiment, the second touch panel may be located below the cooling water hose.

According to an embodiment, the second touch panel may be formed in plural and may also be located above the cooling water hose.

According to an embodiment, the touch panel may optically detect the contact position of the water.

According to an embodiment, the touch panel may capacitively detect the contact position of the water.

According to an embodiment, the touch panel may ultrasonically detect the contact position of the water.

According to another aspect of the present disclosure, a method for detecting water includes detecting a contact position when water makes contact with a touch panel, determining whether the touch panel detecting the contact position is a first touch panel located in a first area where at least one battery module is formed, and generating a first notification and limiting output of the battery module when it is determined that the touch panel detecting the contact position is the first touch panel.

According to an embodiment, the first touch panel may be located below the battery module.

According to an embodiment, the first touch panel may be formed in plural and may also be located above the battery module.

According to an embodiment, the first notification may be generated by at least one method of turning on a warning light, generating a sound alarm, and display on a monitoring device.

According to an embodiment, the contact position detected by the touch panel may be displayed on the monitoring device when the first notification is generated by the method in which the first notification is displayed on the monitoring device.

According to an embodiment, the touch panel may include a second touch panel formed in plural and located in a second area where the battery module is not formed.

According to an embodiment, a second notification may be generated when it is determined that the touch panel detecting the contact position is the second touch panel.

According to an embodiment, the second notification may be generated by at least one method of turning on a warning light, generating a sound alarm, and display on a monitoring device.

According to an embodiment, the contact position detected by the touch panel may be displayed on the monitoring device when the second notification is generated by the method in which the second notification is displayed on the monitoring device.

According to an embodiment, a cooling block may be located in the first area to cool the battery module by making cooling water flow in the cooling block, a cooling water hose may allow the cooling water to flow into or out of the cooling block, and the cooling water hose may be formed in the second area.

According to an embodiment, the cooling block may be located below the battery module.

According to an embodiment, the cooling block may be formed in plural and may also be located above the battery module.

According to an embodiment, the second touch panel may be located below the cooling water hose.

According to an embodiment, the second touch panel may be formed in plural and may also be located above the cooling water hose.

According to an embodiment, the touch panel may optically detect the contact position of the water.

According to an embodiment, the touch panel may capacitively detect the contact position of the water.

According to an embodiment, the touch panel may ultrasonically detect the contact position of the water.

According to another aspect of the present disclosure, a non-transitory computer readable medium containing program instructions executed by a processor may include: program instructions that detect a contact position when water makes contact with a touch panel; program instructions that determine whether the touch panel detecting the contact position is a first touch panel located in a first area where at least one battery module is formed; and program instructions that generate a first notification and limit output of the battery module when it is determined that the touch panel detecting the contact position is the first touch panel.

Other specific details of the present disclosure are included in the detailed description and the drawings.

According to embodiments of the present disclosure, at least the following effects are achieved.

It is possible to detect cooling water leakage or infiltration of foreign matter, including water, and to inform a user of the leakage or infiltration, thereby preventing explosion and ignition of a secondary battery and ensuring safety and reliability.

In addition, since the extent of the cooling water leakage or the water infiltration is determined based on a position rather than a height, it is possible to inform the user of the degree of risk and to perform vehicle control, such as limiting battery output, correspondingly.

Effects according to the present disclosure are not limited to the above-exemplified contents, and more effects are involved in this specification.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
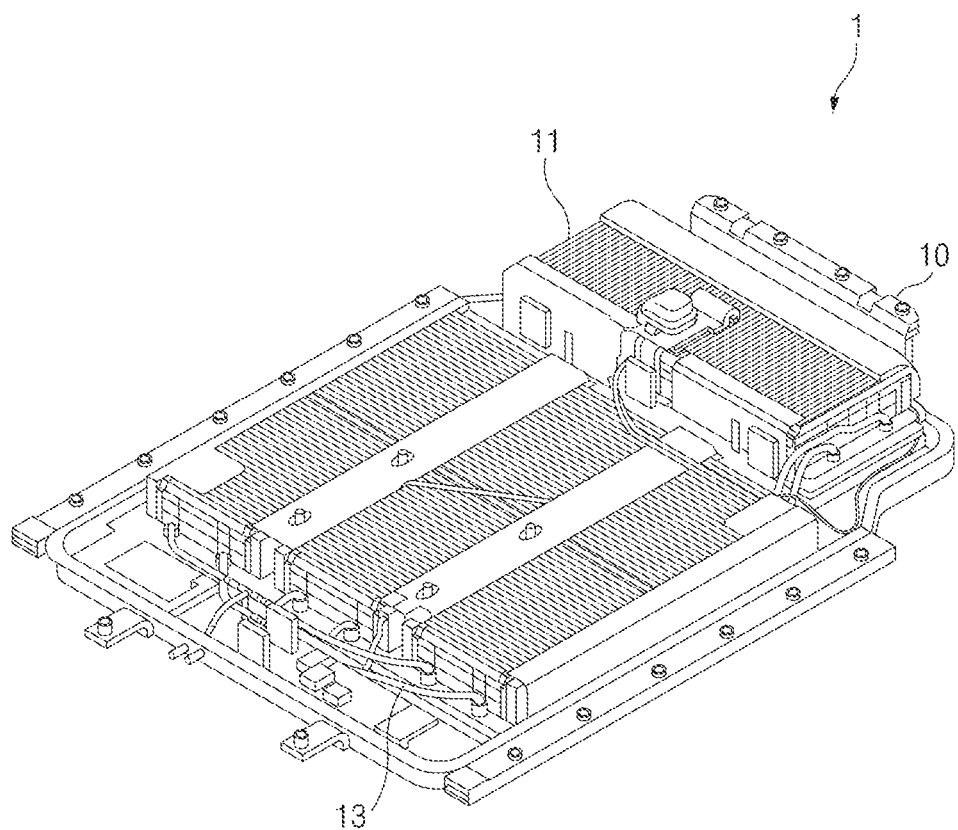
FIG. 1 is a perspective view of a water detection apparatus according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The above and other aspects, features, and advantages of the present disclosure will become apparent from the following description of embodiments given in conjunction with the accompanying drawings. However, the present disclosure is not limited to the embodiments disclosed herein and may be implemented in various different forms. Herein, the embodiments are provided to provide complete disclosure of the disclosure and to provide thorough understanding of the disclosure to those skilled in the art to which the present disclosure pertains, and the scope of the present disclosure should be limited only by the accompanying claims and equivalents thereof. Like numerals will denote like components throughout the specification.

Hereinafter, embodiments of the present disclosure will be described in detail with reference to the accompanying drawings.

FIG. 1 is a perspective view of a water detection apparatus 1 according to an embodiment of the present disclosure.

The water detection apparatus 1 according to an embodiment of the present disclosure may include one or more battery modules 11 that produce and supply electricity to outside of the apparatus (i.e., to the outside), a housing 10 that accommodates the battery modules 11, and touch panels 14 that detect a contact position of water when the water makes contact with a surface thereof, and the touch panels 14 may include first touch panels 141 located in first areas 171 where the battery modules 11 are formed. Hereinafter, details of the water detection apparatus 1 will be specifically described.

The water detection apparatus 1 according to an embodiment of the present disclosure may include the one or more battery modules 11 that produce and supply electricity to the outside and the housing 10 that accommodates the battery modules 11.

Each of the battery modules 11 may produce and supply electricity to the outside and may be manufactured by accommodating a plurality of secondary batteries in a case and covering the secondary batteries with the case. Each of the secondary batteries may include an electrode assembly having electrodes and a separator stacked one above another and a pouch in which the electrode assembly is accommodated. To manufacture the secondary battery, the electrode assembly may be formed by manufacturing a positive electrode and a negative electrode by applying slurry, which is a mixture of an electrode active material, a binder, and a plasticizer, to a positive electrode current collector and a negative electrode current collector, and then stacking the positive electrode and the negative electrode on opposite sides of the separator. Thereafter, the electrode assembly may be accommodated in the pouch, and the pouch may be hermetically sealed after an electrolyte is injected into the pouch.

The electrode assembly may include electrode tabs. The electrode tabs may be connected to the positive and negative electrodes of the electrode assembly, respectively, and may protrude from a side of the electrodes. The electrode tabs may serve as a path along which electrons move between the inside and outside of the electrode assembly. The current collectors of the electrode assembly may include a portion to which the electrode active material is applied and an uncoated distal portion to which the electrode active material is not applied. Each electrode tab may be formed by cutting the uncoated distal portion or by connecting a separate conductive member to the uncoated distal portion through ultrasonic welding. The electrode tabs may protrude in parallel to each other in the same direction from a side of the electrode assembly. Without being limited thereto, however, the electrode tabs may protrude in different directions.

Electrode leads may be connected to the electrode tabs of the electrode assembly through spot welding, and electricity generated from the electrodes may be delivered to the outside through the electrode leads. A portion of each electrode lead may be surrounded by an insulating member. The insulating member may be located at a sealing portion where an upper pouch and a lower pouch of the pouch are thermally fused, and may bond the electrode lead to the pouch. Further, the insulating member may prevent electricity generated from the electrode assembly from flowing toward the pouch through the electrode lead and may maintain the sealing of the pouch. Accordingly, the insulating member may be made of an insulator with non-conductivity that does not allow electricity to pass through it. In general, an insulating tape that is relatively thin and easily adheres to the electrode lead may be mainly used as the insulating member. Without being limited thereto, however, various members capable of insulating the electrode lead may be used as the insulating member.

The electrode leads may extend in the same direction, or in opposite directions, depending on the positions of the positive and negative electrode tabs. The positive electrode lead and the negative electrode lead may be made of different materials. That is, the positive electrode lead may be made of aluminum (Al), similarly to the positive electrode plate, and the negative electrode lead may be made of copper (Cu) or nickel (Ni)-coated copper, similarly to the negative electrode plate. Portions of the electrode leads that protrude outside the pouch may serve as terminals and may be electrically connected with external terminals.

The pouch may be made of a flexible material. The pouch may accommodate the electrode assembly and may be sealed such that portions of the electrode leads, that is, the terminals are exposed. The pouch may include the upper pouch and the lower pouch. The lower pouch may have a cup formed therein to provide a receiving space for accommodating the electrode assembly that has the electrodes and the separator stacked one above another, and the upper pouch may cover the receiving space to prevent the electrode assembly from being separated from the pouch to the outside. In this case, the upper and lower pouches may be manufactured such that one side of the upper pouch and one side of the lower pouch are connected with each other. Without being limited thereto, however, the upper and lower pouches may be manufactured in various ways. For example, the upper and lower pouches may be separately manufactured such that the upper and lower pouches are separated from each other.

After the electrode leads are connected to the electrode tabs of the electrode assembly and the insulating members are formed on a portion of the electrode leads, the electrode assembly may be accommodated in the receiving space formed in the lower pouch, and the upper pouch may cover the receiving space. Thereafter, an electrolyte may be injected into the pouch, and the sealing portion may be formed by sealing the borders between the upper pouch and the lower pouch. As a result, the secondary battery may be manufactured.

Figure 2:
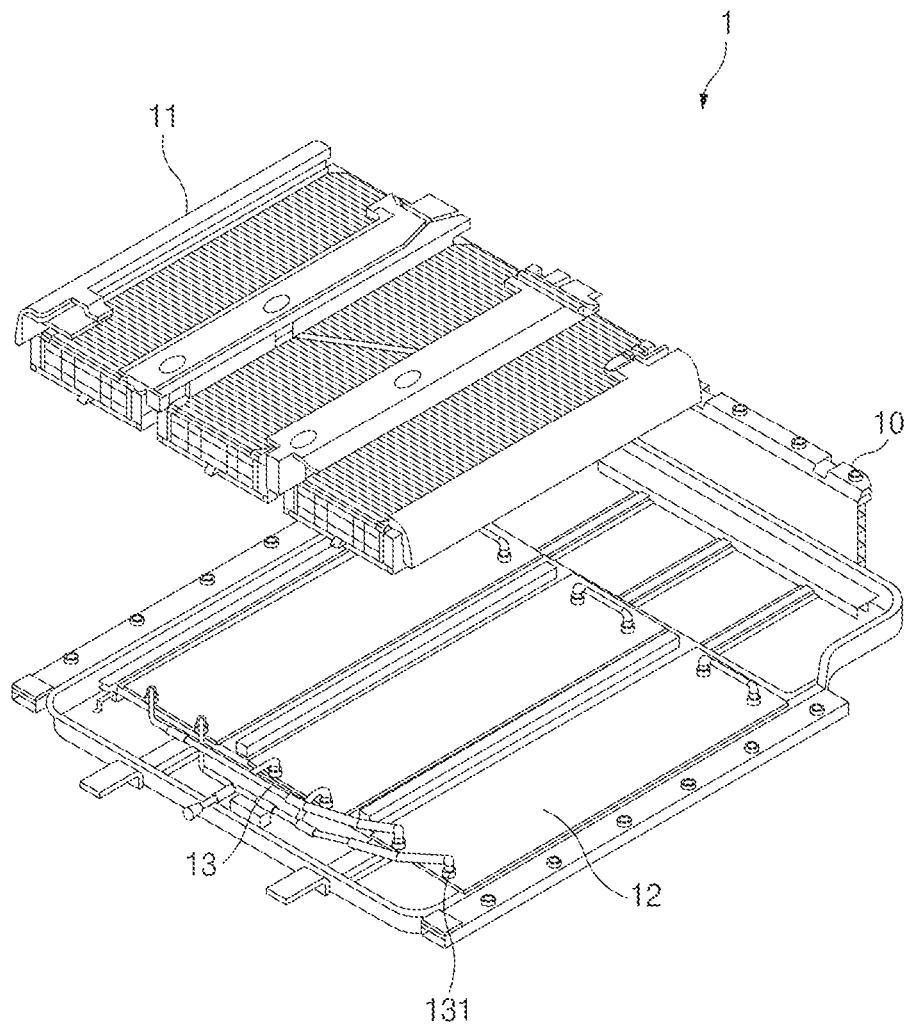
FIG. 2 is an assembly view of a housing and battery modules according to an embodiment of the present disclosure.

FIG. 2 is an assembly view of the housing 10 and some of the battery modules 11 according to an embodiment of the present disclosure.

The one or more battery modules 11 may be accommodated in the housing 10. The battery modules 11 may be secured to the housing 10, and the housing 10 may be inserted into various electrical products that require electric power. Accordingly, the battery modules 11 may be mounted in the electrical products to stably supply electric power to the outside. As illustrated in FIGS. 1 and 2, the housing 10 may have a tray form that is open at the top thereof. Without being limited thereto, however, the housing 10 may have various forms, such as a box form that is closed at the top thereof. Further, only one battery module 11 may be accommodated in the housing 10. Without being limited thereto, however, the plurality of battery modules 11 may be accommodated in the housing 10, as illustrated in FIGS. 1 and 2.

Since the battery modules 11 produce and supply electricity to the outside, many chemical reactions between the electrodes and the electrolyte may take place in the battery modules 11. In this process, heat may be generated from the battery modules 11, and the battery modules 11 may explode due to the heat. Therefore, a cooling system is required to cool the battery modules 11. As described above, the cooling system for cooling the battery modules 11 may be broadly categorized into a water cooling type and an air cooling type. Hereinafter, according to an embodiment of the present disclosure, it will be exemplified that a water cooling system is used to cool the battery modules 11. Without being limited thereto, however, an air cooling system may be used to cool the battery modules 11 according to embodiments of the present disclosure.

The housing 10 may additionally accommodate a cooling block 12 constituting the water cooling system, as well as the battery modules 11. As illustrated in FIG. 2, the cooling block 12 may be located in the first areas 171 where the battery modules 11 are formed and may cool the battery modules 11 by making cooling water flow in the cooling block 12. The cooling block 12 may preferably be located below the battery modules 11. Without being limited thereto, however, a plurality of cooling blocks 12 may be located above the battery modules 11. Meanwhile, to increase efficiency in cooling the battery modules 11, the cooling block 12 may preferably be located to make contact with the battery modules 11, instead of being spaced apart from the battery modules 11. Especially, the cooling block 12 may preferably be located to make contact with the entirety of the largest upper or lower surface of the battery modules 11. Further, in the case where the plurality of battery modules 11 are formed, the cooling block 12 may have a single broad form to cool the plurality of battery modules 11 together. However, to increase cooling efficiency, a plurality of cooling blocks 12 may be formed to separately cool the battery modules 11.

The housing 10 may additionally accommodate cooling water hoses 13 through which cooling water flows into or out of the cooling block 12. The cooling water hoses 13 may be connected to the cooling block 12 through connectors 131 and may make the cooling water flow therein such that the cooling water flows into or out of the cooling block 12. The cooling water hoses 13 may be located in an area where the battery modules 11 are not formed, so as not to overlap the battery modules 11 in the housing 10.

Figure 3:
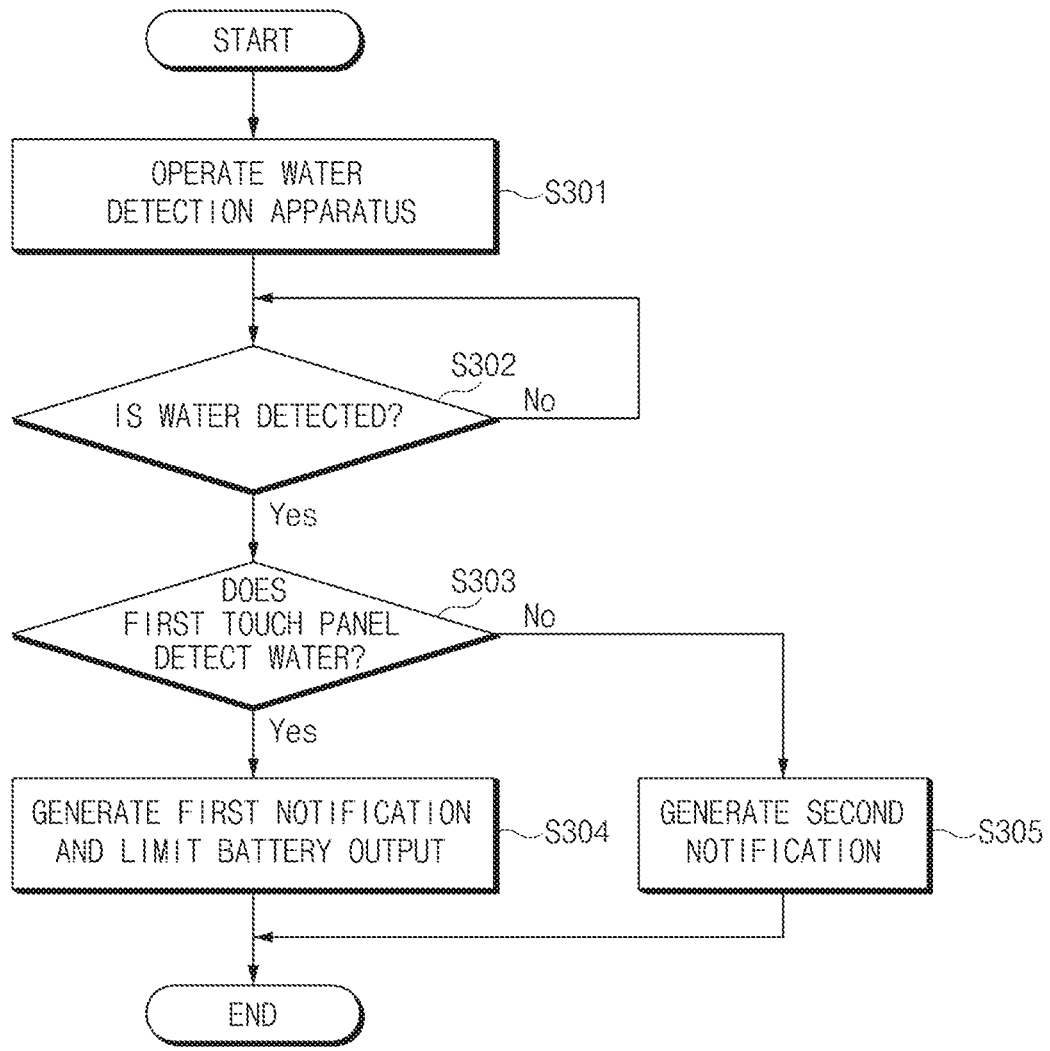
FIG. 3 is a flowchart illustrating a method for detecting cooling water leakage by using the water detection apparatus according to an embodiment of the present disclosure.

FIG. 3 is a flowchart illustrating a method for detecting cooling water leakage by using the water detection apparatus 1 according to an embodiment of the present disclosure.

In the related art, as described above, cooling water is likely to leak out of a water cooling system due to cracks in or damage to the water cooling system. Further, even in the case of an air cooling system, foreign matter, including water, may be introduced into the air cooling system. In addition, cooling water or foreign matter, including water, may infiltrate into the secondary batteries of the battery modules 11 to cause internal short and explosion of the secondary batteries.

To solve these problems, the water detection apparatus 1 according to an embodiment of the present disclosure may further include the touch panels 14 to detect the cooling water or the foreign matter, including water, in advance, thereby enhancing stability of the secondary batteries.

A cooling water leakage detection method using the water detection apparatus 1 according to an embodiment of the present disclosure may include step S302 of detecting a contact position of water when the water makes contact with the touch panels 14, step S303 of determining whether the touch panels 14 detecting the contact position correspond to the first touch panels 141 located in the first areas 171 where the one or more battery modules 11 are formed, and step S304 of generating a first notification and limiting output of the battery modules 11 when it is determined that the touch panels 14 detecting the contact position correspond to the first touch panels 141.

The touch panels 14 may include a plurality of second touch panels 142 located in second areas 172 where the battery modules 11 are not formed, and a second notification may be generated (step S505) when it is determined that the touch panels 14 detecting the contact position correspond to the second touch panels 142.

Hereinafter, the steps depicted in the flowchart of FIG. 3 will be described with reference to FIGS. 4 and 5.

Figure 4:
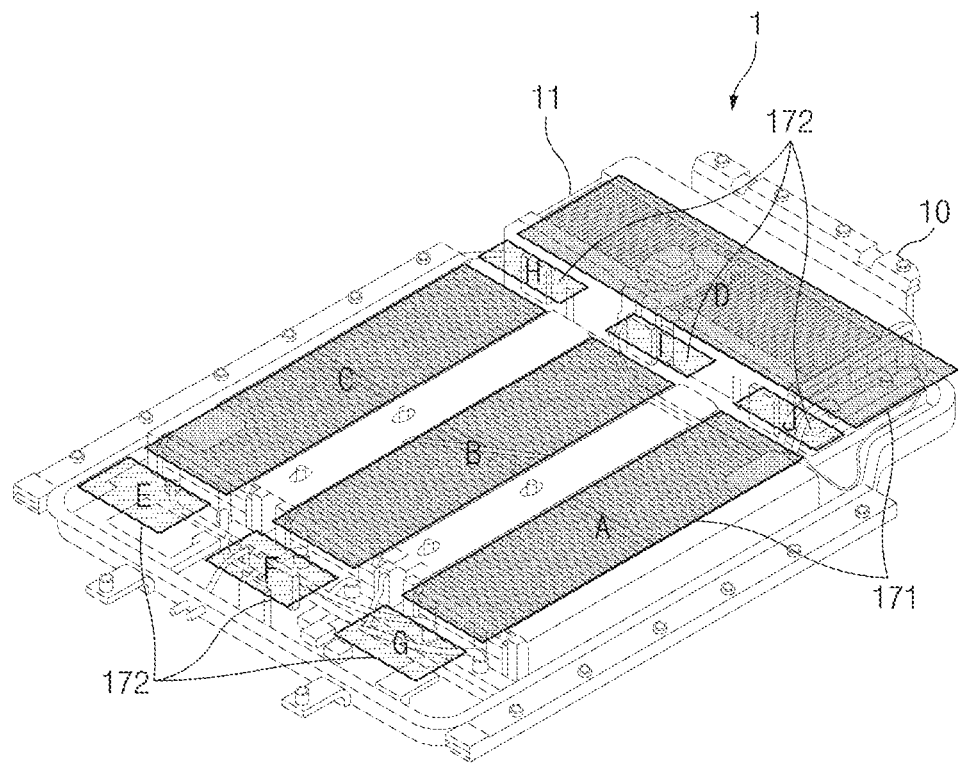
FIG. 4 is a schematic view illustrating first and second areas of the water detection apparatus according to an embodiment of the present disclosure.

FIG. 4 is a schematic view illustrating the first and second areas 171 and 172 of the water detection apparatus 1 according to an embodiment of the present disclosure.

As illustrated in FIG. 4, the water detection apparatus 1 according to an embodiment of the present disclosure may include the first areas 171 where the battery modules 11 are formed and the second areas 172 where the battery modules 11 are not formed. Here, when the battery modules 11 are formed, this means that the battery modules 11 are accommodated and present in the housing 10. Since the first areas 171 and the second areas 172 are two-dimensional areas, the first areas 171 where the battery modules 11 are formed may include areas above and below the battery modules 11. In FIG. 4, areas A, B, C, and D where the battery modules 11 are formed may correspond to the first areas 171.

The touch panels 14 may detect the contact position of water when the water makes contact with the touch panels 14. In general, the touch panels 14 may detect a touch input that a user directly applies to the touch panels 14 by using a body part, such as a finger, and may be used in various other electronic products, as well as display panels of smartphones, tablet PCs, and the like. According to an embodiment of the present disclosure, the touch panels 14 may detect contact of water, as well as recognizing the user's touch input. Accordingly, the touch panels 14 may detect cooling water leakage or water infiltration when water makes contact with the touch panels 14.

In the case where the plurality of touch panels 14 are formed, the touch panels 14 may include the first touch panels 141 (see FIG. 5) located in the first areas 171 and the second touch panels 142 (see FIG. 5) located in the second areas 172. The first touch panels 141 may be located below the battery modules 11 in the first areas 171. Especially, in the water cooling system, the cooling block 12 may be located below the battery modules 11 to make contact with the battery modules 11 to increase efficiency in cooling the battery modules 11. However, the cooling efficiency may be deteriorated when the first touch panels 141 are located between the battery modules 11 and the cooling block 12. Further, when cooling water leaks out due to damage to the cooling block 12, the cooling water may flow downwards. In this case, the cooling water flowing downwards may make contact with the first touch panels 141 only in the case where the first touch panels 141 are located below the cooling block 12. Therefore, when the cooling block 12 is located below the battery modules 11, the first touch panels 141 may preferably be located below the cooling block 12.

As described above, even in the case of an air cooling system, foreign matter, including water, may infiltrate from the outside. Since the foreign matter, including water, is likely to infiltrate from above the battery modules 11, the plurality of first touch panels 141 may be located both above and below the battery modules 11.

The second touch panels 142 may be located in the second areas 172, that is, in any areas where the battery modules 11 are not formed in the housing 10. In FIG. 4, areas E, F, G, H, I, and J where the battery modules 11 are not formed may correspond to the second areas 172. Meanwhile, as described above, in the water cooling system, the housing 10 may additionally accommodate the cooling water hoses 13 through which cooling water flows into or out of the cooling block 12, and the cooling water hoses 13 may be formed in the second areas 172 where the battery modules 11 are not formed. However, when the cooling water leaks out due to damage to the cooling water hoses 13, the cooling water may flow downwards. In this case, the cooling water flowing downwards may make contact with the second touch panels 142 only in the case where the second touch panels 142 are located below the cooling water hoses 13. Therefore, the second touch panels 142 may preferably be located below the cooling water hoses 13.

As described above, even in the case of an air cooling system, foreign matter, including water, may infiltrate from the outside. In this case, the plurality of second touch panels 142 may be located both above and below the cooling water hoses 13.

Meanwhile, the touch panels 14 may include a touch panel 14 located over the first areas 171 and the second areas 172. In this case, even though a single touch panel 14 is located over the first areas 171 and the second areas 172, portions located in the first areas 171 may correspond to the first touch panels 141, and portions located in the second areas 172 may correspond to the second touch panels 142.

As described above, the first notification may be generated when water makes contact with the first touch panels 141, and the second notification may be generated when water makes contact with the second touch panels 142. The operation of the water detection apparatus 1 will be described below in detail.

Figure 5:
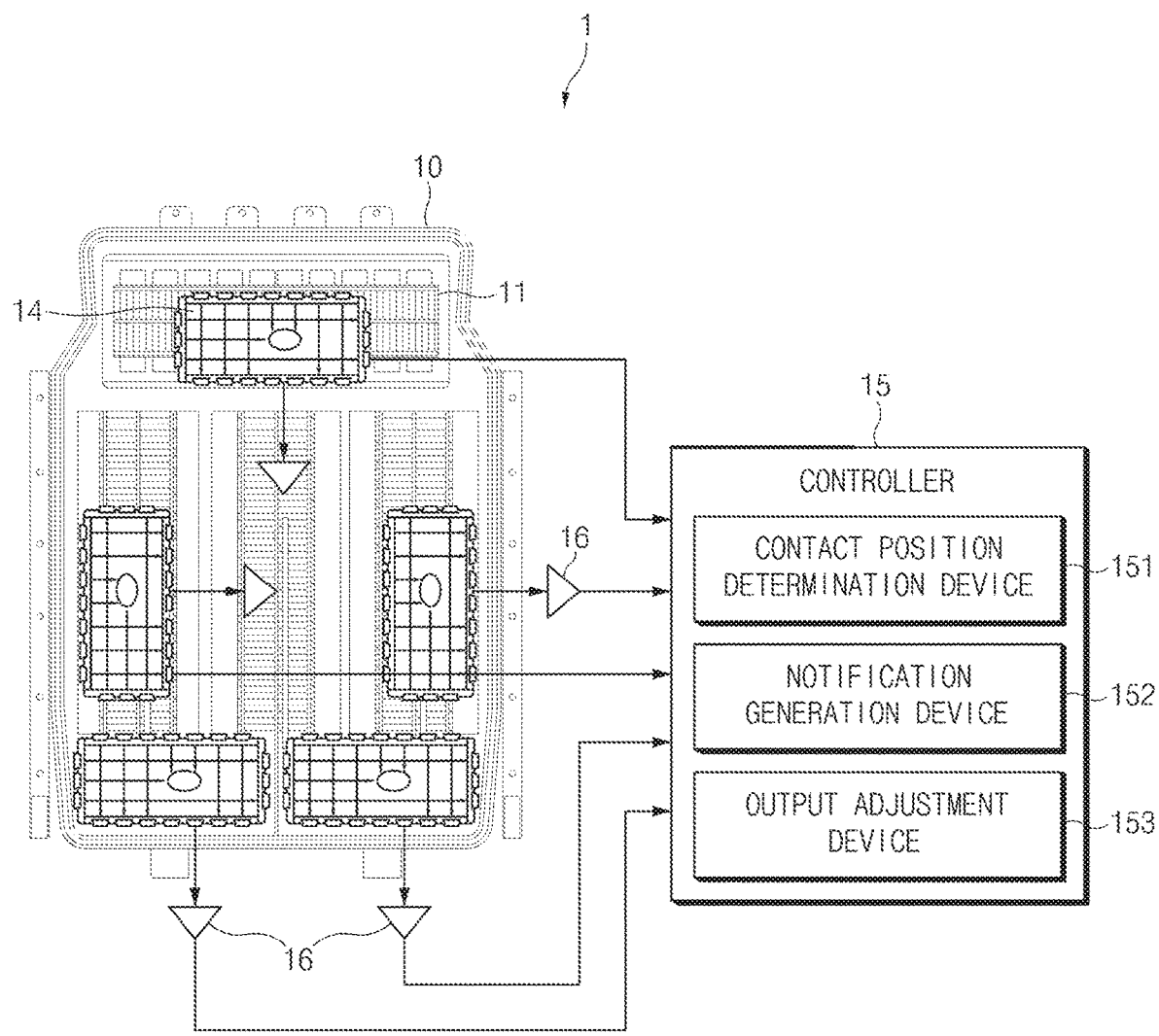
FIG. 5 is a schematic view illustrating an operation of the water detection apparatus according to an embodiment of the present disclosure.

FIG. 5 is a schematic view illustrating an operation of the water detection apparatus 1 according to an embodiment of the present disclosure.

As illustrated in FIG. 5, according to an embodiment of the present disclosure, the first touch panels 141 may be located in the first areas 171, and the second touch panels 142 may be located in the second areas 172. As described above, the first touch panels 141 may be located below the battery modules 11, but may also be located above the battery modules 11, and the second touch panels 142 may be located below the cooling water hoses 13, but may also be located above the cooling water hoses 13. Although FIG. 5 illustrates that the first and second touch panels 141 and 142 are located above the battery modules 11 and the cooling water hoses 13, respectively, the positions of the first and second touch panels 141 and 142 are not limited thereto since FIG. 5 is only a schematic view illustrating an operation of the water detection apparatus 1.

According to an embodiment of the present disclosure, the water detection apparatus 1 may further include a controller 15. The controller 15 may include a contact position determination device 151 that receives a signal from the touch panels 14 and determines water contact position, a notification generation device 152 that generates the first or second notification depending on the types of touch panels 14 with which water makes contact and the contact position, and an output adjustment device 153 that limits output of the battery modules 11.

When water makes contact with the touch panels 14 after the water detection apparatus 1 starts to operate (step S301), an embedded sensor may detect the water contact and may output a converted electrical signal. Since the electrical signal is an analog signal, the electrical signal may be modulated into a digital signal through an M) converter 16. The modulated digital signal may be input to the contact position determination device 151 of the controller 15, and the contact position determination device 151 may detect the water contact position by interpreting the electrical signal by demodulating the digital signal into an analog signal (step S302). Without being limited thereto, however, various methods capable of detecting the water contact position on the touch panels 14 may be used.

When receiving the signal, the contact position determination device 151 of the controller 15 may determine whether the touch panels 14 detecting the water contact position correspond to the first touch panels 141 (step S303). When it is determined that the touch panels 14 detecting the water contact position correspond to the first touch panels 141, the situation may be critical since the water is more likely to immediately infiltrate into the battery modules 11. Accordingly, the notification generation device 152 of the controller 15 may generate the first notification, and the output adjustment device 153 may limit output of the battery modules 11. At this time, the output adjustment device 153 may forcibly reduce the output of the battery modules 11, and if there are many water contact positions on the first touch panels 141, the output adjustment device 153 may completely block the output of the battery modules 11 (step S304).

However, when it is determined that the touch panels 14 detecting the water contact position correspond to the second touch panels 142, the situation may not be critical since the water is less likely to immediately infiltrate into the battery modules 11. Accordingly, the notification generation device 152 of the controller 15 may generate the second notification (step S305). Meanwhile, in this case, the output adjustment device 153 does not need to limit the output of the battery modules 11. Accordingly, the first notification may inform a user that the situation is more critical, compared with the second notification. As described above, the water detection apparatus 1 according to an embodiment of the present disclosure may detect cooling water leakage or infiltration of foreign matter, including water, to inform the user of the leakage or infiltration, thereby preventing explosion and ignition of a secondary battery and ensuring safety and reliability. Further, since the water detection apparatus 1 determines the extent of the cooling water leakage or the water infiltration, based on a position rather than a height, it is possible to inform the user of the degree of risk and to perform vehicle control, such as limiting battery output, correspondingly.

Meanwhile, the first notification and the second notification may be generated by various methods, such as turning on a warning light, generating a sound alarm, display on a monitoring device, and the like, to inform the user of water contact. If the first notification and the second notification are generated by a method of turning on a warning light, there may be a difference between the first notification and the second notification in terms of the color of light or the period at which the warning light is turned on/off. For example, the warning light may emit red light for the first notification and yellow light for the second notification, or may be turned on/off every 0.5 seconds for the first notification and every two seconds for the second notification.

If the first notification and the second notification are generated by using a sound alarm, there may be a difference between the first notification and the second notification in terms of the magnitude or type of sound. For example, a very loud siren may be generated for the first notification, and a small warning sound may be generated for the second notification.

If the first notification and the second notification are generated by a method of displaying the first notification and the second notification on a monitoring device, the types of touch panels 14 with which water makes contact and the water contact position may be displayed on the monitoring device. That is, images arranged similarly to the touch panels 14 may be displayed on the monitoring device, and a red color may be displayed on the images of the touch panels 14 that correspond to the touch panels 14 with which water makes contact, a sound may be generated, or notification text may be displayed. Accordingly, whether the touch panels 14 with which water makes contact correspond to the first touch panels 141 or the second touch panels 142 and where the touch panels 14 are located may be informed to the user.

In addition, the water contact position may be specifically displayed on the monitoring device. That is, a specific water contact point on a specific touch panel 14, as well as the types and positions of touch panels 14 with which water makes contact, may be displayed. As described above, the first notification and the second notification may be generated by various methods capable of notifying the user of water contact.

Figure 6:
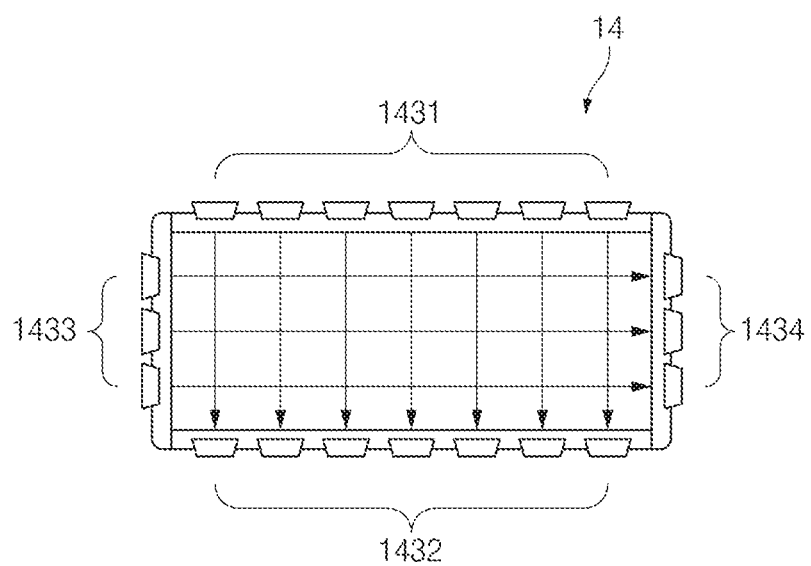
FIG. 6 is a schematic view of a touch panel according to an embodiment of the present disclosure.

FIG. 6 is a schematic view of the touch panel 14 according to an embodiment of the present disclosure.

The touch panel 14 may detect contact of water, as well as recognizing a user's touch input. The touch panel 14 according to an embodiment of the present disclosure may be an optical touch panel that detects contact of water by using infrared light. To this end, the touch panel 14 may include X-axis light emitting parts 1431, X-axis light receiving parts 1432, Y-axis light emitting parts 1433, and Y-axis light receiving parts 1434.

The X-axis light emitting parts 1431 may be arranged in a line along one longitudinal side of the touch panel 14, and the X-axis light receiving parts 1432 may be arranged in a line along an opposite longitudinal side of the touch panel 14. The Y-axis light emitting parts 1433 may be arranged in a line along one lateral side of the touch panel 14, and the Y-axis light receiving parts 1434 may be arranged in a line along an opposite lateral side of the touch panel 14. When the X-axis light emitting parts 1431 and the Y-axis light emitting parts 1433 emit infrared light to the outside, the X-axis light receiving parts 1432 and the Y-axis light receiving parts 1434 may receive the emitted infrared light Although the longitudinal side and the lateral side of the touch panel 14 are defined as the X-axis and the Y-axis, this is only for the convenience of description and is not intended to limit the scope of the present disclosure.

The number of X-axis light emitting parts 1431 may be the same as the number of X-axis light receiving parts 1432, and the number of Y-axis light emitting parts 1433 may be the same as the number of Y-axis light receiving parts 1434. Accordingly, the X-axis light emitting parts 1431 and the X-axis light receiving parts 1432 may correspond to each other, and the Y-axis light emitting parts 1433 and the Y-axis light receiving parts 1434 may correspond to each other. When the X-axis light emitting parts 1431 emit infrared light, the X-axis light receiving parts 1432 corresponding thereto may receive the infrared light, and when the Y-axis light emitting parts 1433 emit infrared light, the Y-axis light receiving parts 1434 corresponding thereto may receive the infrared light.

Figure 7:
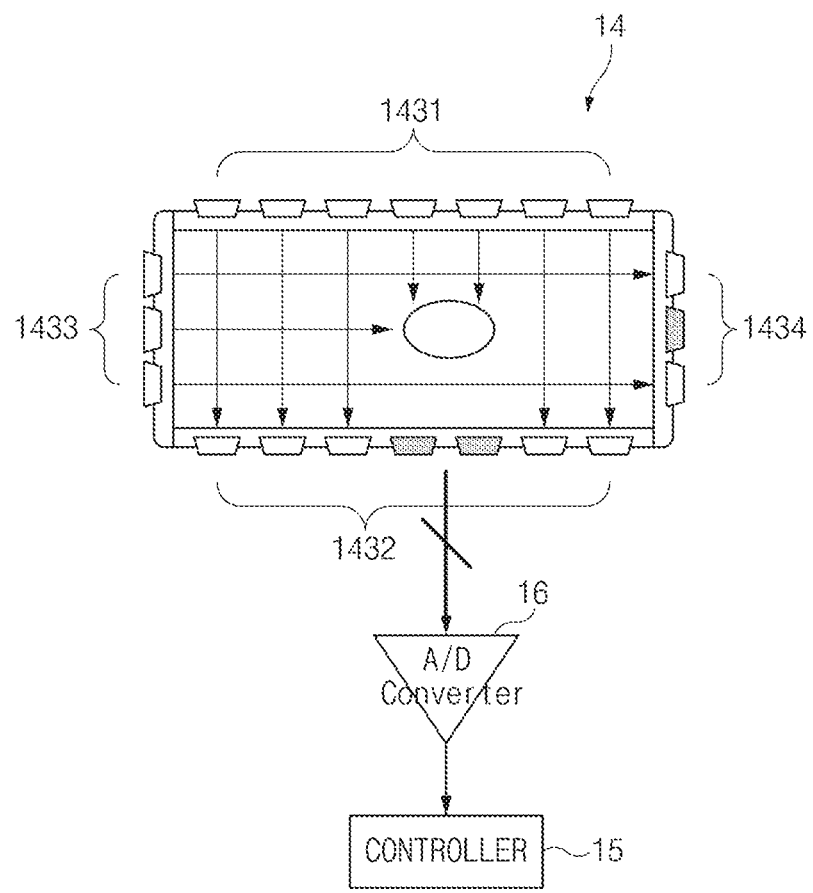
FIG. 7 is a schematic view illustrating an operation of the touch panel according to an embodiment of the present disclosure.

FIG. 7 is a schematic view illustrating an operation of the touch panel 14 according to an embodiment of the present disclosure.

As illustrated in FIG. 7, if water is brought into contact with the touch panel 14 according to an embodiment of the present disclosure, the water obstructs the progress of infrared light. That is, since the optical path of infrared light is blocked, the X-axis and Y-axis light receiving parts 1432 and 1434 may fail to receive infrared light even though the infrared light is emitted from the X-axis and Y-axis light emitting parts 1431 and 1433. When the X-axis and Y-axis light receiving parts 1432 and 1434 fail to receive infrared light, an electrical signal output may vary. The electrical signal may be applied to the controller 15 through the A/D converter 16, and the contact position determination device 151 of the controller 15 may accurately detect the water contact position as coordinates, through the positions of the X-axis and Y-axis light receiving parts 1432 and 1434 that fail to receive infrared light.

Figure 8:
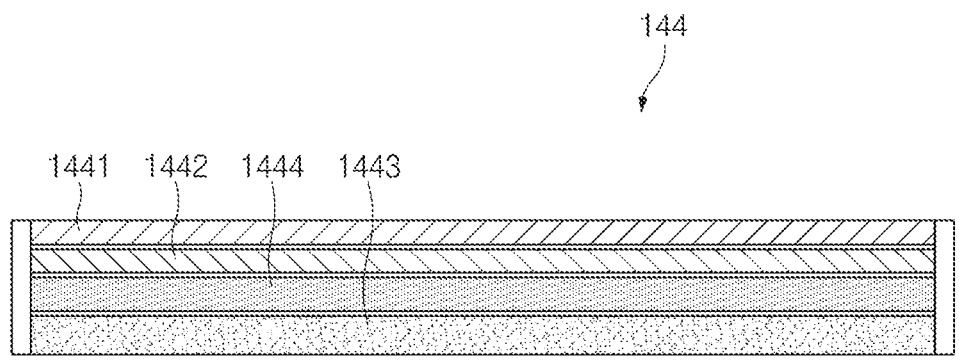
FIG. 8 is a schematic view of a touch panel according to another embodiment of the present disclosure.
Figure 9:
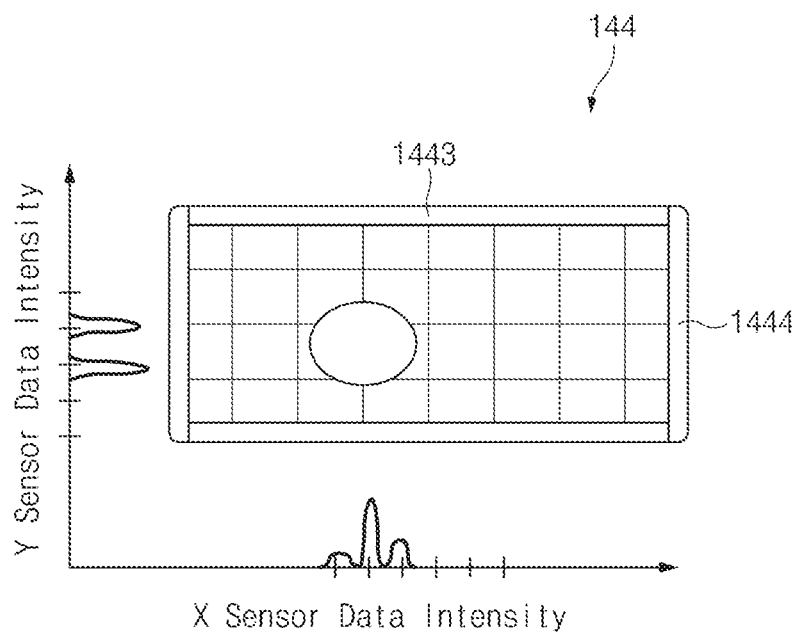
FIG. 9 is a schematic view illustrating an operation of the touch panel according to another embodiment of the present disclosure.

FIG. 8 is a schematic view of a touch panel 144 according to another embodiment of the present disclosure, and FIG. 9 is a schematic view illustrating an operation of the touch panel 144 according to another embodiment of the present disclosure.

The touch panel 144 according to another embodiment of the present disclosure may be a capacitive touch panel using electrical conduction. To this end, as illustrated in FIG. 8, the touch panel 144 may include a surface contact part 1441, a glass substrate 1442, an X-axis sensor 1443, and a Y-axis sensor 1444. Micro-current may flow in the surface contact part 1441. When water makes contact with the surface contact part 1441, capacitance detected by the X-axis sensor 1443 and the Y-axis sensor 1444 may vary as illustrated in FIG. 9, and the water contact position may be detected through the capacitance variation and the location where the capacitance varies.

Although not shown in the drawings, a touch panel according to another embodiment of the present disclosure may be an ultrasonic touch panel using ultrasonic waves. Likewise to the touch panel according to an embodiment of the present disclosure, the touch panel according to another embodiment of the present disclosure may include an X-axis sound wave generator, an X-axis sound sensor, a Y-axis sound wave generator, and a Y-axis sound sensor. When the X-axis sound wave generator generates ultrasonic waves, the X-axis sound sensor corresponding thereto may receive the ultrasonic waves, and when the Y-axis sound wave generator generates ultrasonic waves, the Y-axis sound sensor corresponding thereto may receive the ultrasonic waves. When water makes contact with the touch panel 144, the X-axis and Y-axis sound sensors may fail to receive ultrasonic waves and an electrical signal output may vary correspondingly. The water contact position may be detected through the variation in the electrical signal.

It should be understood that various modifications, variations, and alterations can be made by those skilled in the related art without departing from the spirit and scope of the present disclosure. Accordingly, the above-described embodiments should be understood illustrative, and not restrictive in all aspects. The scope of the present disclosure should be limited only by the accompanying claims and equivalents thereof rather than the detailed description, and various embodiments derived from the meaning and scope of the claims and equivalent concepts thereof should be interpreted as being included in the scope of the present disclosure.

What is claimed is:

1. An apparatus for detecting water, the apparatus comprising:
    at least one battery module configured to produce and supply electricity to outside of the apparatus;
    a housing configured to accommodate the battery module; and
    a touch panel configured to detect a contact position of water when the water makes contact with one surface of the touch panel,
    wherein the touch panel includes a first touch panel located in a first area where the battery module is formed.
2. The apparatus of claim 1, wherein the first touch panel is located below the battery module.
3. The apparatus of claim 2, wherein the first touch panel is formed in plural and is also located above the battery module.
4. The apparatus of claim 1, wherein the touch panel further includes a second touch panel formed in plural and also located in a second area where the battery module is not formed.
5. The apparatus of claim 4, further comprising:
    a cooling block located in the first area to cool the battery module by making cooling water flow in the cooling block; and
    a cooling water hose through which the cooling water flows into or out of the cooling block,
    wherein the cooling water hose is formed in the second area.
6. The apparatus of claim 5, wherein the cooling block is located below the battery module.
7. The apparatus of claim 6, wherein the cooling block is formed in plural and is also located above the battery module.
8. The apparatus of claim 5, wherein the second touch panel is located below the cooling water hose.
9. The apparatus of claim 8, wherein the second touch panel is formed in plural and is also located above the cooling water hose.
10. The apparatus of claim 1, wherein the touch panel optically detects the contact position of the water.
11. The apparatus of claim 1, wherein the touch panel capacitively detects the contact position of the water.
12. The apparatus of claim 1, wherein the touch panel ultrasonically detects the contact position of the water.
13. A method for detecting water, the method comprising:
    detecting, by a controller, a contact position when water makes contact with a touch panel;
    determining, by the controller, whether the touch panel detecting the contact position is a first touch panel located in a first area where at least one battery module is formed; and
    generating, by the controller, a first notification and limiting output of the battery module when it is determined that the touch panel detecting the contact position is the first touch panel.
14. The method of claim 13, wherein the first touch panel is located below the battery module.
15. The method of claim 14, wherein the first touch panel is formed in plural and is also located above the battery module.
16. The method of claim 13, wherein the first notification is generated by at least one method of turning on a warning light, generating a sound alarm, and display on a monitoring device.
17. The method of claim 16, wherein the contact position detected by the touch panel is displayed on the monitoring device when the first notification is generated by the method in which the first notification is displayed on the monitoring device.
18. The method of claim 13, wherein the touch panel includes a second touch panel formed in plural and located in a second area where the battery module is not formed.
19. The method of claim 18, wherein a second notification is generated when it is determined that the touch panel detecting the contact position is the second touch panel.
20. The method of claim 19, wherein the second notification is generated by at least one method of turning on a warning light, generating a sound alarm, and display on a monitoring device.
21. The method of claim 20, wherein the contact position detected by the touch panel is displayed on the monitoring device when the second notification is generated by the method in which the second notification is displayed on the monitoring device.
22. The method of claim 18, wherein a cooling block is located in the first area to cool the battery module by making cooling water flow in the cooling block,
    wherein a cooling water hose allows the cooling water to flow into or out of the cooling block, and
    wherein the cooling water hose is formed in the second area.
23. The method of claim 22, wherein the cooling block is located below the battery module.
24. The method of claim 23, wherein the cooling block is formed in plural and is also located above the battery module.

25. The method of claim 22, wherein the second touch panel is located below the cooling water hose.

26. The method of claim 25, wherein the second touch panel is formed in plural and is also located above the cooling water hose.

27. The method of claim 13, wherein the touch panel optically detects the contact position of the water.

28. The method of claim 13, wherein the touch panel capacitively detects the contact position of the water.

29. The method of claim 13, wherein the touch panel ultrasonically detects the contact position of the water.

30. A non-transitory computer readable medium containing program instructions executed by a processor, the computer readable medium comprising:
- program instructions that detect a contact position when water makes contact with a touch panel;
- program instructions that determine whether the touch panel detecting the contact position is a first touch panel located in a first area where at least one battery module is formed; and
- program instructions that generate a first notification and limit output of the battery module when it is determined that the touch panel detecting the contact position is the first touch panel.

* * * * *